UNITED STATES PATENT OFFICE.

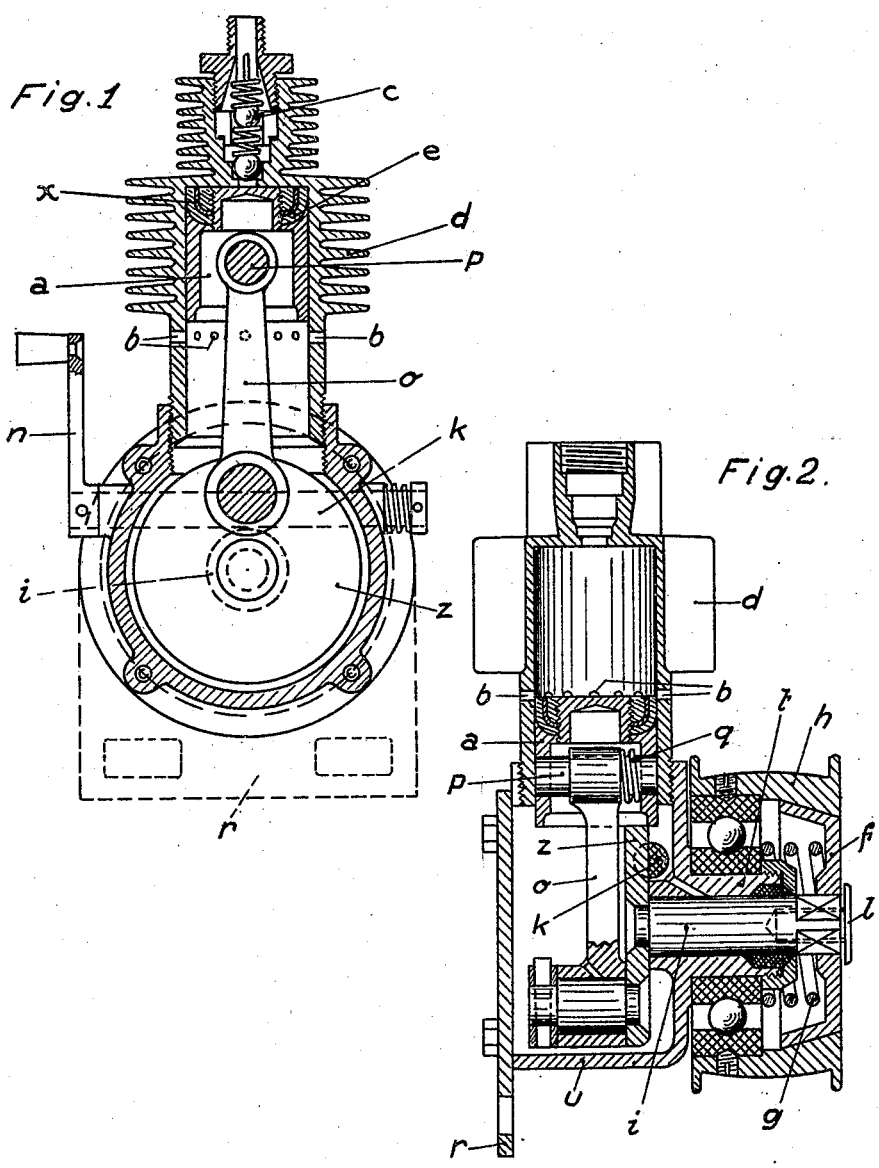

KARL HEINRICH SCHMIDT, OF DUISBURG, GERMANY.

PUMP FOR INFLATING THE TIRES OF VEHICLES.

1,418,884.  Specification of Letters Patent.  Patented June 6, 1922.

Application filed September 29, 1920. Serial No. 413,487.

*To all whom it may concern:*

Be it known that I, KARL HEINRICH SCHMIDT, a citizen of the German Republic, and residing at Duisburg, in the German Republic, with the post-office address Taubenstrasse 18-20, have invented certain new and useful Improvements in and Relating to Pumps for Inflating the Tires of Vehicles, of which the following is a full, clear, and exact description.

This invention relates to pumps for inflating the tires of vehicles, and has for its object to provide an exceedingly simple, reliable, compact and inexpensive construction adapted to be driven by the fan belt. With the new pump the efficiency is obtained not from the power but the speed, the improved pump being capable of running at 2400 revolutions per minute and of fully inflating a tire within four to five minutes. A feature of the invention is the combination of the pump with a clutch device which is formed as a friction clutch.

The invention is illustrated in the accompanying drawing, Figs. 1 and 2 both showing longitudinal sections through the pump.

As shown, the piston $a$ with its gudgeon pin $p$ is actuated by the connecting rod $o$ from the crank shaft $z$ driven by the shaft $i$. The shaft $i$ is mounted in an extension $t$ of the crank disk $u$ and through the medium of squared and threaded parts $l$ is connected with the male conical member $f$ of the friction clutch. The shaft and male conical member of the clutch are pressed by the spring $g$ against the female conical member on the belt pulley $h$ which runs in ball bearings on the extension of the crank case. The disengagement of the clutch against the pressure of the spring is effected by a cam shaft $k$ which extends transversely of the crank disc $z$ and by a cam thereon on rotation of the handle $n$ displaces the shaft $i$ axially. The connecting rod $o$ also takes part in this displacement and in the disengaging movement a spring $q$ assists the movement of the connecting rod on the gudgeon pin $p$.

For the sake of simplicity the pump is shown as provided only with an outlet ball valve $c$ the inlet of air being allowed through holes $b$ in the wall of the cylinder $d$ when the latter is in its innermost position. In order to prevent oil from entering the inflator tube and passing to the tires there is provided a separate sheet steel collar $x$ adapted to press the leather packing collar $c$ continuously outward so that on the return movement of the piston no air will pass through taking oil with it. The pump can easily be bolted to the bed plate $r$.

Now what I claim and desire to secure by Letters Patent is the following:

1. In an air pump driven by a belt the combination of a lateral extension of the crank case containing inside the bearing for the crank shaft with an outer bearing for the belt pulley mounted directly by its inner surface on the said bearing.

2. In an air pump driven by a belt the combination of a lateral extension of the crank case containing inside the bearing for the crank shaft with an axially movable crank shaft and a clutch provided between the crank shaft and the pulley actuated by the said axial movement of the crank shaft.

3. In an air pump driven by a belt the combination of a lateral extension of the crank case containing inside the bearing for the crank shaft with an axially movable crank shaft and a clutch provided between the crank shaft and the pulley actuated by the said axial movement of the crank shaft and with a connecting rod moving axially together with the crank shaft.

4. In an air pump driven by a belt the combination of a lateral extension of the crank case containing inside the bearing for the crank shaft with an axially movable crank shaft and a clutch provided between the crank shaft and the pulley actuated by the said axial movement of the crank shaft and a spring between the clutching member of the crank shaft and the clutching member of the pulley.

In witness whereof, I hereunto subscribe my signature.

KARL HEINRICH SCHMIDT.